United States Patent Office 2,822,410
Patented Feb. 4, 1958

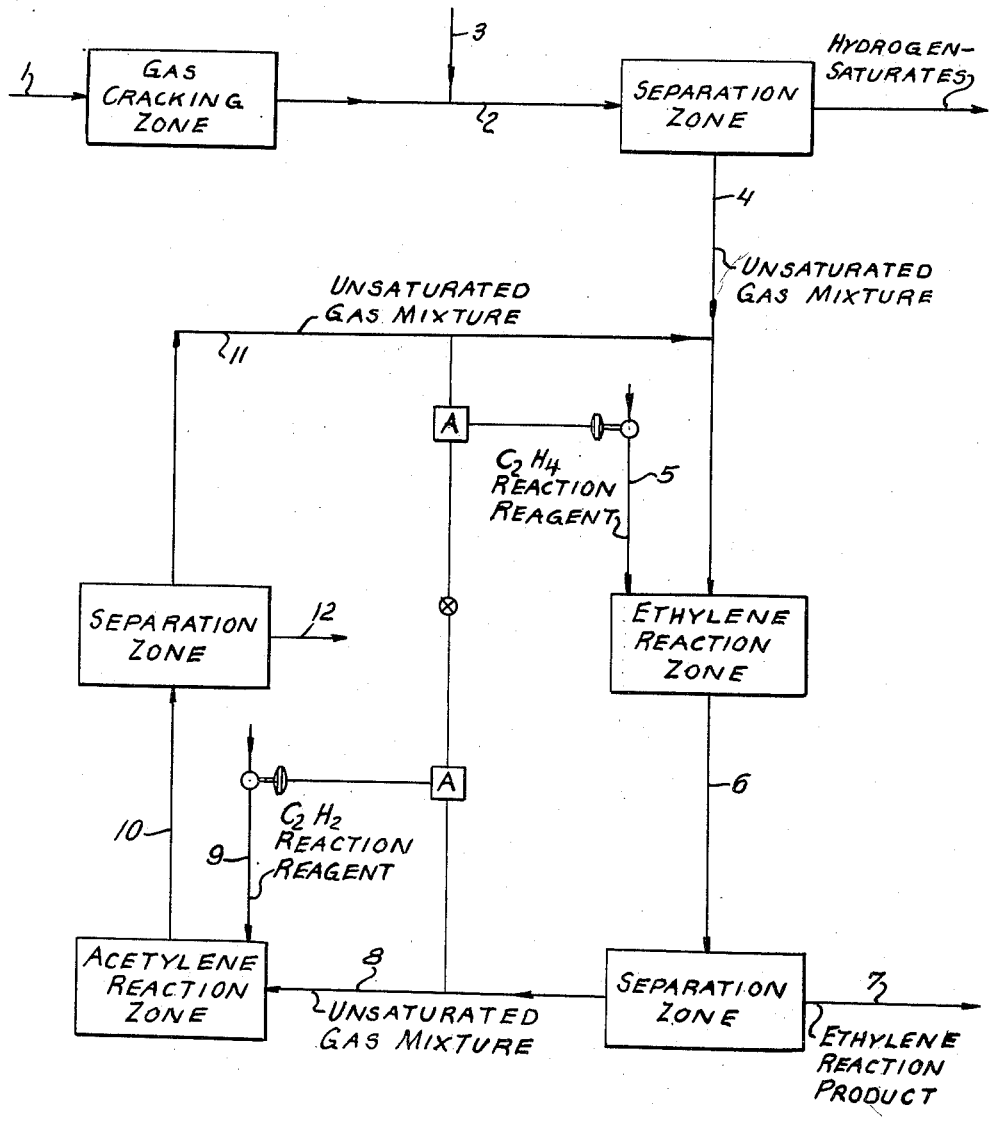

2,822,410

PROCESS FOR UTILIZING MIXTURES OF ETHYLENE AND ACETYLENE WITHOUT SEPARATION THEREOF

Bruno H. Wojcik and Robert M. Thomas, Niagara Falls, N. Y., assignors to Olin Mathieson Chemical Corporation, a corporation of Virginia Application June 11, 1952, Serial No. 292,956

3 Claims. (Cl. 260—679)

Our invention relates to the chemical utilization of mixtures of acetylene and ethylene, particularly such as those obtained from petroleum by the cracking of relatively saturated light hydrocarbon charge stocks. The production of acetylene from hydrocarbon stocks of petroleum origin has not been accomplished by any process competitive with the calcium carbide method of acetylene generation despite the abundance and low cost of available petroleum hydrocarbon charge stocks. Various processes have been proposed and applied commercially or semi-commercially to a limited extent but have obtained only qualified acceptance because of high capital investment requirements, high operating and maintenance costs and relatively low yields of acetylene in dilute admixture with unreacted charge stock and by-products. A particularly heavy cost factor is the extensive purification procedure required to recover the products in useful form.

Although acetylene can be produced comparatively inexpensively in admixture with ethylene, by the so-called "shallow" cracking of petroleum hydrocarbon charge stocks, it is not economically or technically feasible to separate the acetylene and ethylene thus produced because of the similarity in the physical properties of the two gases and their very high chemical reactivity under similar conditions. Some ethylene has been produced however by shallow cracking of light hydrocarbons followed by selective hydrogenation of the acetylene to ethylene, in spite of the waste of the acetylene produced. More recently, chemical experimentation has shown that acetylene and ethylene may be selectively and successively removed from admixture by successive chemical reaction of the acetylene-ethylene mixtures under selected conditions and thus may be recovered in the form of useful chemical derivatives. For example, as disclosed in pending application Serial No. 292,955, filed June 11, 1952, of Bruno H. Wojcik, now abandoned, a mixture of acetylene and ethylene may be passed through a reaction zone in which it is chlorinated in aqueous medium under chlorohydrination conditions. Surprisingly, ethylene chlorohydrin is produced by selective reaction of the ethylene, and the acetylene passes through the reaction zone unchanged. The residual gas stream enriched in acetylene then may be passed through a second reaction zone in which it is reacted under conditions selective for acetylene removal, for example, reaction with acetic acid in the vapor phase at about 175° to 225° C. in the presence of a zinc or cadmium salt supported catalyst, as disclosed in pending application Serial No. 292,902, filed June 11, 1952, of Robert M. Thomas and Ernest H. Millard.

The difficulty with processes based upon chemical utilization of mixtures of acetylene and ethylene produced by low-cost, relatively mild cracking procedures is that the economics of such processes usually depend upon efficient recovery of substantially all of the acetylene and ethylene produced in the cracking process. The various selective reactions available, however, do not lend themselves to economic recovery of 100 percent of the material selectively reacted. Usually yields fall off and production of by-products increases as the reaction conditions are adjusted to carrying the reaction to a high stage of completion, while it rapidly becomes uneconomic to operate at a reduced but more desirable conversion level and re-treat the unreacted material because of rapidly decreasing yields per unit of plant capacity. Recycle operations are not feasible because the continual variation in relative proportions of acetylene and ethylene at various stages of the process and particularly disproportion in the ultimate residual gas stream make it impossible to recycle residual gas with fresh feed to any one of the operating stages. Steady state operation can not be obtained, and thus continuous manipulation and control in each reaction stage to compensate for the variations in the composition of the feed gas in a manner completely unacceptable on a commercial scale would be required.

Our invention is based on the concept of coordinating the extent of conversion in each of the reaction zones in a manner producing an ultimate residual gas stream from the last reaction stage which is suitable in relative proportions of acetylene and ethylene for recycle with the fresh feed mixture to the first reaction stage. Our invention provides a processing system whereby acetylene-ethylene mixtures as produced economically by cracking petroleum hydrocarbon charge stocks are utilized by separating the acetylene-ethylene fraction as a mixture from hydrogen, methane and other saturates and by-products of the cracking operation by means of conventional physical separation methods. The mixture then is subjected in succession to reaction under conditions partially but selectively converting the acetylene and ethylene to chemical derivative products which are susceptible of physical separation from the reaction stream.

The extent of conversion in each reaction zone thus is limited and will depend upon the extent of conversion in the other reaction zones but ordinarily will be of the order of about 20 to 80 percent based on the reacting feed material. Any of the three essential reactions involved may be selected as the base for coordinating the conversion levels in the other reaction stages. The basis for selection may be determined by technical considerations such as the optimum conversion level for a particular reaction in terms of ultimate yield or it may be determined by economic considerations such as the comparative costs of operating the reaction steps at varying conversion levels. Ordinarily it is convenient to control the cracking operation in a manner producing acetylene and ethylene in about equal proportions. The extent of conversion then in each of the successive acetylene and ethylene conversion zones should be coordinated in a manner balancing acetylene consumption with ethylene consumption so that an ultimate residual gas stream containing acetylene and ethylene in approximately equal proportions is produced. On the other hand, steady-state operation also can be obtained by controlling the cracking reaction in a manner producing a mixture predominating in either acetylene and ethylene so as to compensate for a higher level of conversion for this component in its subsequent reaction compared to the conversion level for the other component in its reaction.

Thus according to our invention, a mixture of acetylene and ethylene is continuously circulated in a closed cycle through an acetylene conversion zone and through an ethylene conversion zone. The order of reaction depends upon the particular selectivity of the reactions involved. A fresh feed mixture of acetylene and ethylene is added as make-up to the gas stream recirculating to the first of said conversion zones. The mixture is reacted in each of the conversion zones with reactant and under conditions for selective but partial conversion of the acetylene and ethylene in the presence of each other. The acetylene and ethylene reaction products are separated before circulation of the residual gas stream to the next conversion zone is continued. The extent of conversion in each conversion zone is limited to a level of partial conversion balancing the consumption of acetylene and ethylene in each of the selective conversion zones, taking into account the effect of conversion in the cracking zone on the composition of the fresh feed mixture; whereby a substantially constant composition for the recirculating gas stream plus the fresh feed make-up is maintained under conditions of steady state operation. Advantageously, the fresh feed mixture for make-up is derived from a "shallow" cracking hydrocarbon operation, the conversion level of which in turn may be controlled to coordinate the feed make-up composition with that of the circulating gas stream.

Our invention will be further described by reference to the accompanying drawing in which a simplified flow diagram of our invention is shown. The charge gas, e. g. ethane, is charged as indicated by line 1 to a gas cracking zone in which it is converted under conditions of thermal cracking controlled by means of temperature and contact time to a mixture of cracked products wherein the proportion of acetylene to ethylene advantageously is approximately equimolar. The cracked gas product mixture is passed to a separation zone as indicated by line 2. Line 3 indicates that a quenching fluid may be added to assist in termination of the cracking reaction. In the separation zone, the unsaturated gas mixture containing approximately equimolar proportions of acetylene and ethylene is separated from the rest of the cracked products, largely comprising hydrogen, methane and light saturated hydrocarbons. The unsaturated gas mixture is passed by line 4 to an ethylene reaction zone in which the mixture is contacted with a reactant selective for ethylene, added as shown by line 5. The extent of reaction in the ethylene reaction zone is controlled and the reaction mixture is passed as indicated by line 6 to a second separation zone in which the ethylene reaction product is recovered for removal as indicated by line 7. The residual gas is passed as indicated by line 8 from the separation zone to an acetylene reaction zone in which it is contacted with a reactant selective for acetylene, added as indicated by line 9. The extent of reaction in the acetylene reaction zone is controlled and the reaction mixture is passed as indicated by line 10 to a further separation zone in which the acetylene reaction product is separated for removal as indicated by line 12. The residual gas which by cooperative control of the extent of reaction in each of the acetylene and ethylene reaction zones contains unreacted acetylene and ethylene in approximately equimolar proportion is recirculated as indicated by line 11 to charge line 4 to the ethylene reaction zone. Advantageously, the operation is automatically controlled in a manner balancing the extent of conversion in each of the reaction zones by means responsive to at least one of the two gas analyzers indicated on the drawing by the letter A. As shown, the control is through the feed rate of either or both of the ethylene and acetylene reactants by means of appropriate automatically actuated valving.

Examples of reaction which may be applied according to our invention for the selective conversion of ethylene in the presence of acetylene including the following:

(1) Ethylene chlorohydrin may be prepared in good yields and with good conversions as described in pending application Serial No. 292,955, filed June 11, 1952, of Bruno H. Wojcik by introducing the gas mixture in an appropriate manner with chlorine into an aqueous reaction system under chlorohydrination conditions to convert the ethylene to ethylene chlorohydrin. Surprisingly, the acetylene contained in the gas passes through the chlorohydrination reaction without change and may subsequently be recycled to the first stage.

(2) By liquid phase chlorination in a chlorohydrocarbon solvent, particularly in the presence of iron or iron chloride catalysts, as described in pending application Serial No. 293,581, filed June 14, 1952, of Victor C. Fusco, ethylene may be converted to ethylene dichloride while acetylene is substantially unaffected.

(3) The ethylene may also be converted to ethyl chloride by admixture with hydrogen chloride and passage over a catalyst as described in pending application Serial No. 292,847, filed June 11, 1952, of Ernest H. Millard, Jr., now U. S. Patent No. 2,779,805. For example, hydrogen chloride in sufficient quantity to be stoichiometrically equivalent to the ethylene present in the charge gas is passed over a zinc chloride-impregnated carbon catalyst at about 160° C. to convert the ethylene to ethyl chloride and minor proportions of acetylene to vinyl chloride. Surprisingly, under these conditions acetylene is converted only in relatively minor proportions. Vinyl chloride and ethyl chloride are carried out by the residue gas. They are separated from the gas stream by refrigeration and fractionated. The stripped gas is passed to the acetylene-separating step of the present process.

Examples of reactions which may be applied for the selective conversion of acetylene in the presence of ethylene include the following:

(1) Vinyl chloride may be prepared by passing the gas, together with an excess of hydrogen chloride gas, based on the acetylene content of the charged gas, over an adsorptive catalyst such as activated carbon impregnated with mercuric chloride at temperatures of about 175–220° C. and a contact time of 20 to 25 seconds. Under these conditions ethylene does not react. The vinyl chloride is separated from the residual gas by condensation at relatively low temperatures, the excess hydrogen chloride is separated by washing with water and the residual mixture is recycled to the first stage.

(2) Vinyl acetate may be prepared as described in pending application Serial No. 292,902, filed June 11, 1952, of Robert M. Thomas and Ernest H. Millard, Jr. by vapor-phase reaction in the presence of a catalyst, for example, zinc acetate, at temperatures of about 175–225° C. Alternatively if the ethylene is removed in the first stage until it comprises less than about 10% of the gaseous mixture by volume, liquid-phase catalysts may be used for the conversion of the acetylene to vinyl acetate. Such a catalyst is prepared, for example, by dissolving about 4 grams of mercuric oxide, 1.5 grams of boron trifluoride and 0.5 gram of hydrogen fluoride in 1 kilogram of acetic acid. The mixed gas is passed through the catalyst solution at temperatures of 30–55° C. In batch operation dry sodium acetate is added to the solution to destroy the catalysts and the solution is distilled to recover vinyl acetate and acetic acid. In a continuous operation a portion of the catalyst mixture may be continuously withdrawn, neutralized and distilled, and the recovered acetic acid may be recharged with fresh catalysts to the reaction chamber. The gas passing from the reaction mixture is scrubbed and/or refrigerated to remove acetic acid and vinyl acetate therefrom and is recycled to the first stage reaction.

(3) Dichloroethylene, $CHCl:CHCl$, may be prepared as described in pending application Serial No. 292,901, filed June 11, 1952, of Robert M. Thomas and John W. Churchill by passing the residual mixture of acetylene and ethylene with 2 moles of hydrogen chloride per mole of acetylene and an excess of air through a solution containing cuprous chloride, cupric chloride and ammonium chloride in aqueous hydrochloric acid. Using this catalyst, a major proportion of the acetylene charged is reacted and converted to dichloroethylene. Ethylene does not react under these conditions. The dichloroethylene is separated by partial condensation or scrubbing and the residual gas is recycled to the first stage.

The resulting trans-dichloroethylene is useful for the manufacture of vinylidene chloride by the addition of hydrogen chloride and subsequent demuriation, for the preparation of perchloroethylene by the addition of chlorine to trichloroethylene and demuriation of the resulting pentachloroethane to tetrachloroethylene.

(4) Acrylonitrile may be prepared by contacting the gas with suitable proportions of hydrogen cyanide in the presence of a catalyst, for example, 0.8 mole of KCl, 0.2 mole of NaCl and 1 mole of CuCl. For example, about 0.1 to 0.2 mole of hydrogen cyanide is introduced per mole of acetylene in the gas and the proportion of cuprous chloride in the catalyst mixture stands in a ratio of about 40 to 50 parts by weight per part of hydrogen cyanide.

When the acetylene content of the gas is particularly low, vapor-phase conversion of the acetylene to the acrylonitrile is preferable. A mixture of the gas with somewhat less than the stoichiometric amount of hydrogen cyanide based on the acetylene content of the gas is passed at about 400–700° C. over a catalyst comprising barium oxide precipitated on carbon. Conversions and yields are excellent while the ethylene content of the gas is unaffected.

(5) Acetylenic alcohols may be prepared as described in pending application Serial No. 294,395, filed June 19, 1952, of Victor C. Fusco, now U. S. Patent No. 2,742,517, by absorbing the acetylene from the gas mixture in a suspension of finely divided potassium hydroxide in an inert solvent, e. g. xylene, while ethylene is unabsorbed. Addition of an aldehyde or ketone to the acetylene enriched suspension produces the desired carbinol. For example, acetone gives rise to 2-methyl-3-butyn-2-ol and acetaldehyde to 3-butyn-2-ol. Vinyl ethers are formed by the reaction of alcohols in the suspension. Thus n-butanol forms vinyl n-butyl ether.

(6) Butynediol-1,4 may be prepared by introduction of the gas under a pressure of about 75 p. s. i. together with an aqueous 15% formaldehyde solution to a reactor packed with a catalyst such as copper acetylide impregnated silica. The temperature maintains itself at about 100–120° C. The effluent liquor contains about 5% of unreacted formaldehyde but the quantity of formaldehyde present can be reduced to about 0.5% by passage of the liquor with additional quantities of the gas mixture through a second reactor. The effluent gas from both reactors may be purified by refrigeration for recycle to the first stage of the process of the present invention. On distillation of the reactor liquid, small proportions of propargyl alcohol and major proportions of butynediol-1,4 are obtained.

(7) Vinyl ethers may be prepared by contacting the gas mixture with an alcohol containing the corresponding sodium alcoholate dissolved therein. About 0.5–2% of the alcoholate acts as catalyst. The temperature may range from 120°–200° C. Pressure sufficient to maintain the alcohol in the liquid phase is applied. With methanol the reaction is very rapid even at 120° C. under a pressure of 300 p. s. i. With higher alcohols a temperature of about 180° C. is preferable. The alkyl vinyl ethers are separated from the gas stream by refrigeration and/or from the alcohol solution by distillation depending on the volatility of the ether.

(8) Styrene may be prepared from the acetylene-rich residue gas from the first stage by passing it together with benzene over a catalyst in the vapor phase. For example, a mixture of about 5 to 20 moles of benzene per mole of acetylene in the residue gas is introduced at a pressure of 100 to 600 p. s. i. over a catalyst consisting of calcined mixed hydrogels of silica and alumina at a temperature of about 350–500° C. The resulting mixture is quenched, distilled and/or solvent extracted to recover the styrene. Residual unreacted gases, freed of benzene and other higher boiling products, are recycled to the first stage.

We claim:

1. In the utilization of mixtures of acetylene and ethylene without pre-separation thereof the process which comprises passing a mixture of acetylene and ethylene in a closed cycle between an acetylene conversion zone and an ethylene conversion zone, adding fresh feed mixture as make-up to the gas stream circulating to one of the conversion zones while withdrawing a residual gas stream from the other of the conversion zones for recirculation with the make-up to the first conversion zone, reacting the mixture in the acetylene conversion zone with a reactant and under conditions selectively converting acetylene to a chemical derivative thereof which is susceptible to physical separation from the residual gas stream, reacting the mixture in the ethylene conversion zone with a reactant and under conditions selectively converting ethylene to a chemical derivative thereof susceptible of physical separation from the residual gas stream, controlling the extent of conversion in each of the conversion zones to a level of partial conversion whereby the ultimate residual gas stream contains acetylene and ethylene in proportions suitable for recirculation with fresh feed make-up to the first conversion zone.

2. A process for the utilization of mixtures of acetylene and ethylene without pre-separation thereof which comprises producing a mixture of acetylene and ethylene by subjecting a hydrocarbon charge stock to pyrolysis, passing the mixture of acetylene and ethylene in a closed cycle between an acetylene conversion zone and an ethylene conversion zone, adding fresh feed mixture as make-up to the gas stream circulating to one of the conversion zones while withdrawing a residual gas stream from the other of the conversion zones for recirculation with the make-up to the first conversion zone, reacting the mixture in the acetylene conversion zone with a reactant and under conditions selectively converting acetylene to a chemical derivative thereof which is susceptible to physical separation from the residual gas stream, reacting the mixture in the ethylene conversion zone with a reactant and under conditions selectively converting ethylene to a chemical derivative thereof susceptible of physical separation from the residual gas stream, controlling the extent of conversion in said pyrolysis zone and in said acetylene and ethylene conversion zones to a level of partial conversion whereby the ultimate residual gas stream contains acetylene and ethylene in proportions suitable for recirculation with fresh feed make-up to the first conversion zone.

3. A process for the utilization of mixtures of acetylene and ethylene without pre-separation thereof which comprises producing a mixture of acetylene and ethylene of about equimolar proportions by subjecting a hydrocarbon charge stock to pyrolysis, passing a mixture of acetylene and ethylene in a closed cycle between an acetylene conversion zone and an ethylene conversion zone, adding fresh feed mixture as make-up to the gas stream circulating to one of the conversion zones while withdrawing a residual gas stream from the other of the conversion zones for recirculation with the make-up to the first conversion zone, reacting the mixture in the acetylene conversion zone with a reactant and under conditions selectively converting acetylene to a chemical derivative thereof which is susceptible to physical separation from the residual gas stream, reacting the mixture in the ethylene conversion zone with a reactant and under conditions selectively converting ethylene to a chemical derivative thereof susceptible of physical separation from the residual gas stream, controlling the extent of conversion in each of the conversion zones to a level of partial conversion whereby the ultimate residual gas stream contains acetylene and ethylene in proportions suitable for recirculation with fresh feed make-up to the first conversion zone.

References Cited in the file of this patent

UNITED STATES PATENTS

| | | |
|---|---|---|
| 2,238,490 | Hasche | Apr. 15, 1941 |
| 2,520,712 | Cheney | Aug. 29, 1950 |